US009553421B2

(12) United States Patent
Fermann

(10) Patent No.: US 9,553,421 B2
(45) Date of Patent: Jan. 24, 2017

(54) COMPACT ULTRA-SHORT PULSE SOURCE AMPLIFIERS

(71) Applicant: IMRA AMERICA, INC., Ann Arbor, MI (US)

(72) Inventor: Martin E. Fermann, Dexter, MI (US)

(73) Assignee: IMRA AMERICA, INC., Ann Arbor, MI (US)

( * ) Notice: Subject to any disclaimer, the term of this patent is extended or adjusted under 35 U.S.C. 154(b) by 0 days.

(21) Appl. No.: 14/571,367

(22) PCT Filed: Oct. 16, 2013

(86) PCT No.: PCT/US2013/065169
§ 371 (c)(1),
(2) Date: Dec. 16, 2014

(87) PCT Pub. No.: WO2014/062759
PCT Pub. Date: Apr. 24, 2014

(65) Prior Publication Data
US 2015/0311666 A1    Oct. 29, 2015

Related U.S. Application Data

(60) Provisional application No. 61/714,344, filed on Oct. 16, 2012.

(51) Int. Cl.
*H01S 3/067* (2006.01)
*H01S 3/00* (2006.01)
(Continued)

(52) U.S. Cl.
CPC ......... *H01S 3/1106* (2013.01); *B23K 26/0624* (2015.10); *H01J 49/161* (2013.01);
(Continued)

(58) Field of Classification Search
CPC . H01S 3/0057; H01S 3/06754; B23K 26/0624
See application file for complete search history.

(56) References Cited

U.S. PATENT DOCUMENTS 5,450,427 A    9/1995  Fermann
5,696,782 A   12/1997  Harter
(Continued)

FOREIGN PATENT DOCUMENTS

WO    2014/062759 A2    4/2014

OTHER PUBLICATIONS

Saeid Amini-Nik, Ultrafast Mid-IR Laser Scalpel: Protein Signals of the Fundamental Limits to Minimally Invasive Surgery in the Sep. 2010, vol. 5 issue of PLOS ONE (open access online journal) doi:10.1371/journal.pone.0013053.

(Continued)

*Primary Examiner* — Eric Bolda
(74) *Attorney, Agent, or Firm* — Sughrue Mion, PLLC; Richard C. Turner

(57) ABSTRACT

The present invention relates to compact, low noise, ultra-short pulse sources based on fiber amplifiers, and various applications thereof. At least one implementation includes an optical amplification system having a fiber laser seed source producing seed pulses at a repetition rate corresponding to the fiber laser cavity round trip time. A nonlinear pulse transformer, comprising a fiber length greater than about 10 m, receives a seed pulse at its input and produces a spectrally broadened output pulse at its output, the output pulse having a spectral bandwidth which is more than 1.5 times a spectral bandwidth of a seed pulse. A fiber power amplifier receives and amplifies spectrally broadened output pulses. A pulse compressor is configured to temporally compress spectrally broadened pulses amplified by said power amplifier. Applications include micro-machining, ophthalmology, molecular (Continued)

desorption or ionization, mass-spectroscopy, and/or laser-based, biological tissue processing.

36 Claims, 6 Drawing Sheets

(51) Int. Cl.
  B23K 26/062 (2014.01)
  H01S 3/11 (2006.01)
  H01S 3/094 (2006.01)
  H01J 49/16 (2006.01)

(52) U.S. Cl.
  CPC ........ *H01S 3/0057* (2013.01); *H01S 3/06754* (2013.01); *H01S 3/094026* (2013.01); *H01S 3/0675* (2013.01); *H01S 3/06708* (2013.01); *H01S 3/06741* (2013.01); *H01S 3/094061* (2013.01); *H01S 3/1115* (2013.01)

(56) References Cited

U.S. PATENT DOCUMENTS

| | | | |
|---|---|---|---|
| 6,198,568 B1* | 3/2001 | Galvanauskas | H01S 3/0057 359/332 |
| 6,885,683 B1 | 4/2005 | Fermann | |
| 7,088,756 B2 | 8/2006 | Fermann | |
| 7,167,300 B2 | 1/2007 | Fermann | |
| 7,190,705 B2 | 3/2007 | Fermann | |
| 7,330,301 B2 | 2/2008 | Harter | |
| 7,688,499 B2 | 3/2010 | Fermann | |
| 7,773,294 B2* | 8/2010 | Brunet | H01S 3/06754 359/341.3 |
| 8,031,396 B2 | 10/2011 | Fermann | |
| 8,040,929 B2 | 10/2011 | Imeshev | |
| 8,072,678 B2 | 12/2011 | Fermann | |
| 2002/0071645 A1 | 6/2002 | Hogan | |
| 2004/0005153 A1 | 1/2004 | Watanabe | |
| 2004/0125434 A1* | 7/2004 | Kumar | G02F 1/395 359/330 |
| 2005/0041702 A1 | 2/2005 | Fermann et al. | |
| 2005/0163426 A1 | 7/2005 | Fermann et al. | |
| 2005/0218122 A1 | 10/2005 | Yamamoto et al. | |
| 2005/0225846 A1 | 10/2005 | Nati | |
| 2005/0226278 A1 | 10/2005 | Gu | |
| 2005/0226286 A1* | 10/2005 | Liu | H01S 3/06712 372/25 |
| 2005/0226287 A1 | 10/2005 | Shah | |
| 2006/0120418 A1 | 6/2006 | Harter et al. | |
| 2009/0028193 A1* | 1/2009 | Islam | H01S 5/0064 372/6 |
| 2009/0244695 A1 | 10/2009 | Marcinkevicius et al. | |
| 2011/0069723 A1 | 3/2011 | Dong et al. | |
| 2011/0170564 A1 | 7/2011 | Desbiens et al. | |

OTHER PUBLICATIONS

Hoenninger et al., Q-switching stability limits of continuous-wave passive mode locking, Josa B, vol. 16, Issue 1, pp. 46-56 (1999).
Peng et al., High-Pressure Gas Phase Femtosecond Laser Ionization Mass Spectrometry in the Jul. 3, 2012, vol. 84 issue of Analytical Chemistry.
Rezenom et al. in 'Infrared laser-assisted desorption electrospray ionization mass spectrometry' published on Nov. 29, 2007, in vol. 133 of Analyst, pp. 226-232 (2008).
A. Steinmetz et al., Sub-5-ps, multimegawatt peak-power pulses from a fiber-amplified and optically compressed passively Q-switched microchip laser, Optics Letters, vol. 37, Issue 13, pp. 2550 (2012).
International Search Report, dated May 20, 2014, application No. PCT/US2013/065169, pp. 1-4.
Written Opinion of International Searching Authority, dated May 20, 2014, Application No. PCT/US2013/065169; pp. 1-7.

* cited by examiner

COMPACT ULTRA-SHORT PULSE SOURCE AMPLIFIERS

CROSS-REFERENCE TO RELATED APPLICATIONS

This application is a by-pass continuation of international application No. PCT/US2013/065169, filed Oct. 16, 2013, which claims priority to U.S. Provisional Application No. 61/714,344, filed Oct. 16, 2012. The contents of the prior applications are incorporated herein by reference in their entirety.

FIELD OF THE INVENTION

The present teachings relate to compact, low noise, ultra-short pulse sources based on fiber amplifiers, and various applications thereof.

BACKGROUND

Ultra-short pulse sources have had a major impact on laser-based technology during the last decade. Applications include imaging, micro-machining and ophthalmology. Because of their unique stability, compactness and ease of construction, fiber laser based ultra-short pulse sources have started to dominate the ultra-short pulse source market segment. Exemplary ultra-short pulse sources are described in U.S. Pat. Nos. 8,031,396; 7,688,499; 7,167,300; 6,885,683 and 5,696,782. In order to be able to address many industrial applications, pulse sources producing pulse widths ranging from sub picosecond to 10 ns are highly desirable, where in order to minimize cost, preferably, these systems are based on the same technology platform.

Modelocked fiber lasers are an attractive source for producing pulses in the fs to ns range, where further amplification in fiber amplifiers can be implemented to reach pulse energies up to the mJ level. Thus, an all-fiber system construction can be achieved.

One limitation of all-fiber systems is the relatively low pulse energies of mode-locked fiber oscillators. Several fiber amplification stages may be required to reach high pulse energies. Another limitation arises from the requirement of linear amplification stages as, for example, encountered when implementing chirped pulse amplification systems, which limit the achievable peak power from fiber amplifiers. As the pulse energy and/or peak power is increased, chirped pulse amplification further requires complex schemes for pulse stretching and compression with precisely matched values of dispersion. On the other hand, when nonlinear fiber amplifiers are employed, the pulse quality can be detrimentally affected when implementing pulse compression stages after the nonlinear fiber amplifiers.

Gain-switched diode-based laser systems or micro-chip lasers have been implemented as front ends to fiber amplifiers to circumvent the limitation of all fiber systems, but so far with limited success. For example, it is generally very difficult to generate bandwidth-limited pulses from gain-switched diode lasers in the pulse width range from 10 ps-1 ns, and also the generation of pulse width tunable systems with pulse widths around 100 ps is relatively complex. As other examples, continuous wave emitting diode lasers have been suggested as a solution to pulse width tunable short pulse laser systems (U.S. Pat. No. 7,330,301 to D. J. Harter et al.). Arrangements of pulse shortening stages implemented in conjunction with micro-chip lasers can require relatively complex schemes to minimize pulse jitter. For example, see A. Steinmetz et al., Sub-5-ps, multimegawatt peak-power pulses from a fiber-amplified and optically compressed passively Q-switched microchip laser, Optics Letters, Vol. 37, Issue 13, pp. 2550 (2012).

SUMMARY

In one aspect, the present invention provides a method and system for generating high energy pulses from mod-elocked fiber oscillators based on the implementation of high energy picosecond (ps) fiber oscillators. The coherence of the fiber oscillators and their stability is ensured by selecting an appropriate value of dispersion and oscillator bandwidth.

In another aspect, a fiber-based pulse transformer increases the available peak power output of a pulsed laser system while improving pulse quality.

In another aspect, the present invention provides for the generation of coherent or partially coherent pulses over a wide range of pulse widths, energies, and/or repetition rates.

In one or more implementations, oscillators with pulse widths adjustable from the ps to ns range can be constructed using oscillator pulse characteristic(s) with reduced values of coherence.

Examples herein demonstrate that the use of ps-ns oscillators enables the generation of high energy pulses directly from fiber amplifiers without a requirement for complicated pulse stretching schemes.

With the use of ps-ns oscillator pulses, and by appropriate design of the amplification stages, the bandwidth and the chirp of the amplified high energy pulses can be manipulated. Such an implementation provides for the generation of pulses with relatively small bandwidth for subsequent non-linear frequency conversion while allowing for the generation of high quality compressed pulses, with a pulse width much shorter than the pulses generated by the ps-ns oscillators.

Embodiments of the present invention are compatible with fiber lasers based on rare-earth dopants, such as Nd, Er, Yb, Tm, or Ho, for example.

Certain embodiments of the present invention may utilize an optical amplification system in which an output of a power amplifier provides an input to a frequency converter. An optional pulse transformer and/or pulse compressor may be included prior to frequency conversion to provide spectrally broadened pulses and/or compressed pulses to the frequency converter.

Ps and ns pulse sources are suitable for use in a vast number of industrial and medical applications, for example. Reduced cost of such ps and ns pulse sources can provide for efficient implementation of frequency conversion schemes to both the UV (up-conversion) and the IR (down-conversion), further expanding the application potential. In addition the low cost of the pulse sources further expands the capability for applications that were traditionally covered by ns solid state lasers. For example, the ionization of gases, liquids and solids can be performed with a very high ionization efficiency, allowing the implementation of such pulse sources in spectroscopy applications, such as mass spectroscopy.

BRIEF DESCRIPTION OF THE DRAWINGS

FIG. 4a illustrates obtainable autocorrelation traces of compressed 1 ps pulses obtained with (solid line) and without the pulse transformer (dashed line); FIG. 4b illustrates the corresponding optical spectra at the output of the power amplifier.

DETAILED DESCRIPTION

Figure 1:
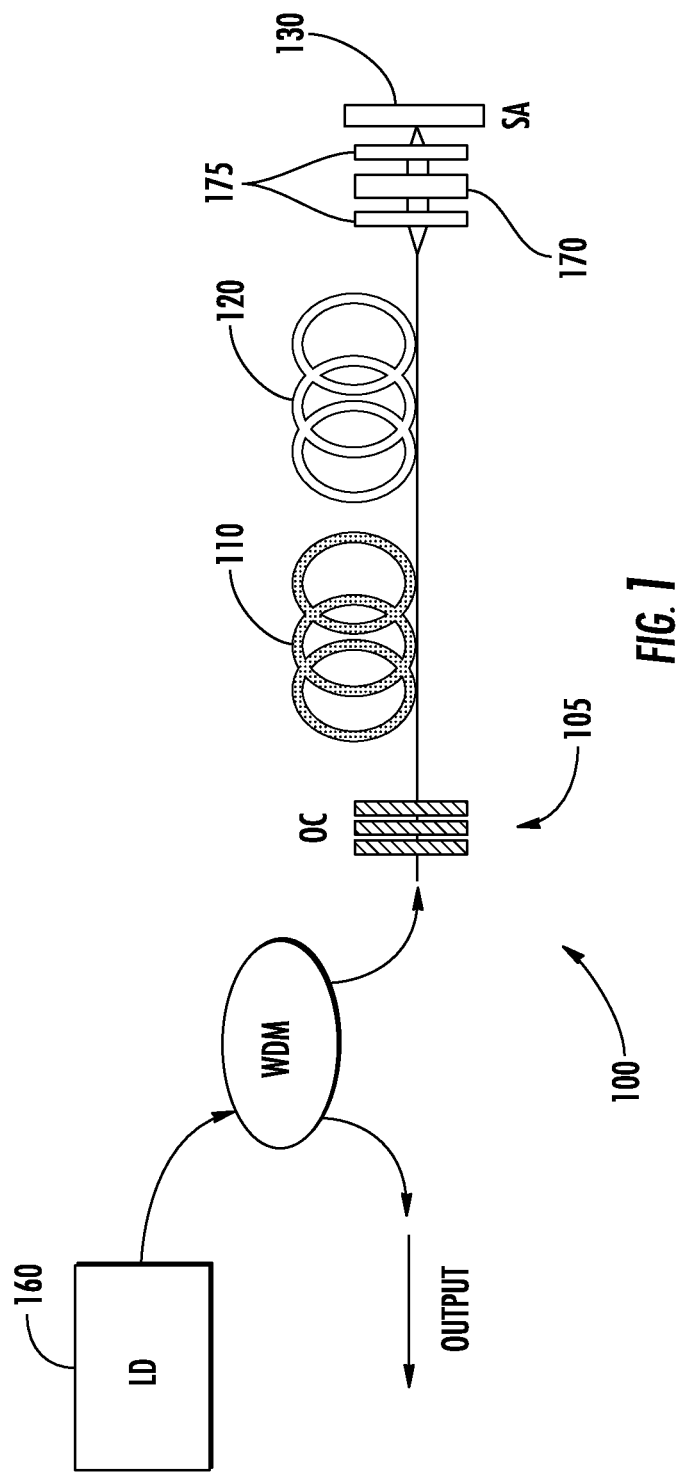
FIG. 1 schematically illustrates a high energy ps fiber pulse oscillator with low susceptibility to Q-switching instabilities.

FIG. 1 shows a mode-locked, dispersion compensated fiber oscillator 100. The gain element of the laser includes a rare-earth doped amplifier fiber 110. Also, an optional length of undoped fiber 120 can be spliced to the gain fiber in order to reduce the repetition rate of the oscillator. The undoped fiber can further be a photonic crystal fiber or a Kagome fiber to minimize the amount of self-phase modulation in the undoped fiber 120 and to maximize the possible pulse energy. Preferably the oscillator is configured with overall negative dispersion at the signal wavelength within the gain bandwidth of the gain fiber. Examples of rare-earth doping materials include but are not limited to Er, Er/Yb, Nd, Yb, Ho, Pr, Yb/Tm or Tm, for example.

The laser cavity includes a saturable absorber mirror 130, which has high reflectivity (HR) at the signal wavelength. The cavity includes an output coupling element (OC) 105 which has partial transmittance for the signal wavelength. In this example a chirped fiber Bragg grating is illustrated as the output coupling element.

The chirped fiber Bragg grating 105 can be designed with negative dispersion in order to compensate for the overall positive dispersion of the intra-cavity fiber(s) 110 and 120. The chirped fiber Bragg grating can be written in standard single mode silica fiber fusion spliced to the gain fiber 110. Fiber splicing techniques for silica fibers are well known and are not further discussed here. The use of chirped fiber Bragg gratings in mode-locked fiber oscillators is described in U.S. patents U.S. Pat. Nos. 5,450,427 ('427) and 7,088,756 ('756) to Fermann et al. The '427 and '756 patents are hereby incorporated by reference in their entirety. Alternatively, the chirped fiber Bragg grating can be written directly into the rare-earth doped fiber. Such an implementation is not separately shown. The saturable absorber mirror 130 is preferably mounted onto a heat sink.

Mode-locking operation of the oscillator is initiated and stabilized by the saturable absorber mirror 130. Details about suitable saturable absorber mirrors are disclosed in the '756 patent to Fermann et al. The end of the intra-cavity fiber 110 which is not spliced to the fiber Bragg grating is preferably anti-reflection coated with a reflectivity of less than 0.1%. Alternatively the fiber end can be angle cleaved. The optical output from this end is imaged via relay optics 175 onto the saturable absorber mirror 130. The relay optics allows adjustment of the spot size and therefore the fluence on the saturable absorber, independent from the mode field diameter in the gain medium. Alternatively the saturable absorber mirror can be butt coupled onto the AR coated or cleaved fiber end. A polarization beam splitter (PBS) 170 is included in the cavity to provide polarization selection.

For the case of Er or Yb oscillators, the oscillator can be pumped with telecom grade single mode pump diodes 160 at wavelengths about 980 nm. The pump light can be coupled into the gain fiber via a WDM coupler as shown in FIG. 1 and additional fiber sections or pig-tails (not shown).

For low noise operation of the laser 100, the use of low noise pump lasers is preferred because noise of the pump laser leads to excess noise in the modelocked oscillator. This is especially important for noise at noise spectral frequencies below the lifetime of the active laser transition in the modelocked oscillator where no filtering action of the laser medium is present. Pump laser noise may be reduced either by active noise cancellation via acousto-optical modulators or passively by diode pumping another cw pump laser which is used as pump laser for the modelocked fiber oscillator. For example a cw Er fiber laser can be used for pumping a Tm fiber laser.

An isolator for the signal light (not shown) can be further integrated into the WDM coupler for improved oscillator stability. The pump light counter-propagates relative to the signal light in the output pigtail and passes through fiber Bragg grating 105 into the cavity. To enhance the available pump power two pump diodes can be coupled into a polarization maintaining fiber and can be polarization multiplexed by a polarizing beam combiner. Alternatively, two pump diodes operating at different wavelengths can be used in series to provide high levels of pump power to the oscillator. Such configurations are well known in the state of the art and are not further discussed here.

In one implementation the arrangement shown in FIG. 1 can be constructed from polarization maintaining (PM) fiber to provide a high degree of environmental stability. Alternatively, only some fiber sections can be PM and other sections can be non PM. In this case additional polarization controllers can also ensure stable modelocked operation.

The use of intra-cavity chirped fiber Bragg gratings allows the incorporation of large values of negative dispersion into the cavity which can be configured to restrict the oscillating pulse bandwidth. As a result, highly coherent, high power soliton pulses with ps pulse widths can be generated inside such oscillators. In certain preferred embodiments the bandwidth of the fiber grating is carefully selected to minimize Q-switching instabilities and to maximize the coherence of the oscillating pulses. Any Q-switching instability in a fiber laser tends to increase the bandwidth of the Q-switch pulse via self-phase modulation. In the presence of a bandwidth restriction, this bandwidth increase produces an increase in loss, which tends to suppress the Q-switching instability resulting in stable modelocked operation. Such a mechanism was for example described in C. Hoenninger et al., Q-switching stability limits of continuous-wave passive mode locking, JOSA B, Vol. 16, Issue 1, pp. 46-56 (1999).

Two variations of FIG. 1 were implemented as working examples. A first implementation generated highly coherent pulses in the ps-ns range. A second implementation was used to generate pulses with reduced coherence, referred to herein as "noise pulses":

Working Example #1

Coherent Pulse Generation

A working example was constructed following the specific design example as shown in FIG. 1, in which a semiconductor saturable absorber for mirror 130 was used for modelocking. In the working example, all intra-cavity fibers 110, 120 were polarization maintaining (PM). A Yb fiber with an absorption of about 500 dB/m was used as the gain fiber 110 to construct a high power soliton laser. The total intra-cavity fiber length, which included doped fiber 110 and undoped fiber 120, was selected as 2 m to allow oscillation at repetition rates of 50 MHz. The oscillator was pumped with a SM diode laser with a power up to 750 mW at 980 nm. To generate 5 ps pulses at 1030 nm, a grating 105 having a dispersion of $-5$ $ps^2$ was used, where the grating bandwidth was 0.5 nm and the grating reflectivity about 50%.

The generated temporal pulse shapes are influenced by stability conditions as typically found with respect to soliton lasers, namely, the grating bandwidth has to be sufficiently small in order to prevent the formation of incoherent or partially coherent pulse forms or to prevent Q-switching. Generally, the generation of longer ps pulses requires an increase in grating dispersion (in absolute terms) and a reduction in grating bandwidth. However, longer ps pulses can also be generated by using incoherent or partially coherent pulse characteristics. Such pulses generally have much higher pulse energies than soliton-like pulses and further allow for tuning of the oscillator pulse width by varying the oscillator pump power.

For the generation of near bandwidth-limited pulses the use of grating reflectivities <90% is advantageous, otherwise the grating "carves out" (reflects) the central part of the generated spectrum, producing a pulse much broader than the bandwidth limit. However, such spectrally broadened oscillator pulses can be of some benefit in conjunction with additional pulse shortening stages. As a guideline, the generation of coherent soliton like oscillator pulses requires a grating bandwidth in nm$<5/\sqrt{D_{grat}[ps^2]}$, where $D_{grat}[ps^2]$ is the grating dispersion in $ps^2$ to facilitate the suppression of Q-switching instabilities and to ensure a high level of coherence for the generated pulse forms. Therefore, for a grating dispersion of 5 $ps^2$, the grating bandwidth should be <2 nm.

Using appropriate values for grating dispersion, highly coherent pulses with widths from 1 ps-1 ns, greater than about 5 ps, greater than about 10 ps, and/or up to about 10 ns can be generated. Pulse repetition rates can be preselected from 1 MHz to 1 GHz determined by the intra-cavity fiber length. In various implementations for amplification to high pulse energies, the output obtained at the output of a fiber amplifier downstream of the oscillator may, for example, be in the range from 1-1000 µJ. In the oscillator, pulse repetition rates <50 MHz may be utilized, or <25 MHz with some increase in available pulse energy. Pulse energy may be further increased with oscillator pulse repetition rates <25 MHz. Depending on the desired system configuration, oscillator repetition rates <10 MHz can increase the available oscillator pulse energy, for example up to several µJ with a pulse width in the range from about 10 ps-10 ns based on the design illustrated in FIG. 1. Generally, appropriate saturable absorbers (SAs) need to be also selected in order to ensure stable pulse oscillation, for example the SAs should enable some pulse forming function for the desired pulse width. The SAs preferably have at least one decay component with a life-time in the vicinity of the desired pulse width. Such a lifetime is not critical, however, indeed, it was verified that even saturable absorbers with a life time ten times shorter than the obtained pulse width enabled the oscillation of stable coherent pulses.

Working Example #2

Partially Coherent Pulse Generation

The cavity design shown in FIG. 1 is also adaptable for the generation of partially coherent or incoherent pulses, sometimes also referred to as noise bursts. Such 'noise' pulses can be distinguished from highly coherent pulses by their phase properties. By way of example, gain-switched laser diodes or Fourier domain mode locked lasers are known to generate pulses with reduced temporal coherence. Just as modelocked lasers, noise sources produce pulses at the cavity round trip time. However, whereas the temporal phase of highly coherent modelocked pulses is approximately time-invariant from pulse to pulse and well defined, the phase of 'noise' pulses generally fluctuates from pulse to pulse or at least has a substantial level of random noise. Another useful distinguishing feature is compressibility: highly coherent modelocked pulses can be essentially compressed to near their transform limit, which is not the case for noise pulses. This is true even if precision pulse shapers are used for pulse compression that can compensate for higher order phase modulations in the temporal waveform of the pulses.

In an exemplary embodiment of a noise pulse source the fiber grating was chirped with a dispersion of $-1$ $ps^2$. Note, however, that the dispersion and the chirp of the fiber grating was not critical and incoherent pulses can also be obtained with other grating dispersion values. Whereas in the above Example #1 the grating 105 bandwidth was 2 nm, the grating bandwidth in the present example was 10 nm and the grating center wavelength was 1045 nm. The grating reflectivity was 10%. A conventional SA mirror was also used to enable modelocking. A single polarization in the cavity was selected with a polarizer and an additional pump blocking filter was used to prevent pump light from hitting the saturable absorber mirror. Two additional lenses 175 were used inside a saturable absorber module to collimate the light from the PM undoped fiber 120 and to focus it onto the saturable absorber 130. Such focusing arrangements are well known in saturable absorber designs and are not further discussed here.

When pumping with a pump power up to 500 mW at 980 nm the laser generated pulses at a repetition rate of 1 MHz with an average power between 40-100 mW. The pulse width varied in a range from 200 ps-1.3 ns for average power values between 40-100 mW. The pulse energies thus varied in a range from 40-100 nJ depending on output power. The pulse spectral width was 3 nm and depended only weakly on pump power. The spectral width of the pulses as well as the pulse width was further changeable by changing the grating bandwidth, generally, the broader the grating bandwidth, the broader the pulses. The pulse bandwidth can further be controlled with additional intra-cavity bandpass filters (not shown). The pulse width can further be adjusted by adjusting the cavity dispersion; generally a larger absolute value of dispersion produces longer pulses.

The RF noise of pulse trains comprising incoherent pulses can indeed be very low, indicating a high degree of suppression of Q-switching instabilities. In this example the RF power density near the relaxation oscillation peak of the laser located at about 1050 kHz was suppressed by more than 90 dB compared to the spectral power density of the RF peak at around the repetition rate of ≈1 MHz. Instead of a grating, only the 4% Fresnel reflection of the fiber can also be used as a cavity mirror. In this case the RF spectrum showed some increased amplitude noise of the laser. Generally, the amplitude noise of the pulse train was very low and maximum short term fluctuations of the pulse energy of ±5% were observed.

To extract the largest pulse energy from such fiber lasers, the use of large mode gain fibers and large-mode undoped fibers is most advantageous. This also applies to the generation of highly coherent ps pulses. Here we classify large mode fibers as fibers that have core-diameters >10 μm and preferably >15 μm. Pulse energies of several μJ can be generated at repetition rates of 1 MHz. Moreover, the repetition rate of the pulse train can simply be selected by changing the intra-cavity fiber length. High pulse energies can further be extracted by inserting photonic crystal fibers or photonic crystal fibers with central air holes such as Kagome fibers in place of the PM undoped fiber. Photonic crystal fibers can be spliced to standard fiber or lens arrangements can be used to optically couple photonic crystal fibers to standard fibers. Moreover, PM photonic crystal fibers are also well known in the state of the art, so the replacement of PM undoped fiber with photonic crystal fibers is straight forward and is not shown separately.

Since the pulses generated by the modelocked oscillators are generally affected by self-phase modulation and stimulated Raman scattering, the maximum pulse energy is limited. This limitation is most severe for highly coherent pulses, whereas for incoherent or partially coherent pulses, the presence of self-phase modulation (SPM) is not as restricting. Particularly, for the generation of soliton-like pulse forms, the maximum tolerable value of intra-cavity self-phase modulation is of the order of $\pi$, or at most several $\pi$. On the other hand, for partially coherent pulse forms or chirped pulse forms, intra-cavity self-phase modulation values can exceed $10\pi$. Therefore, further amplification of the pulses in additional amplifiers is highly desirable.

The examples above demonstrate flexibility for generating pulses with a certain degree of coherence with an arrangement according to FIG. 1, which includes a mode-locked fiber oscillator. It is apparent that various design options and tradeoffs are possible. For example, although compressibility of partially coherent pulses is limited a stable pulse train can be generated with low q-switching instability. In cases where high oscillator pulse energy is important a reduced degree of coherence can be advantageous. On the other hand, coherent pulses are well suited for minimizing compressed pulse widths.

Figure 2:
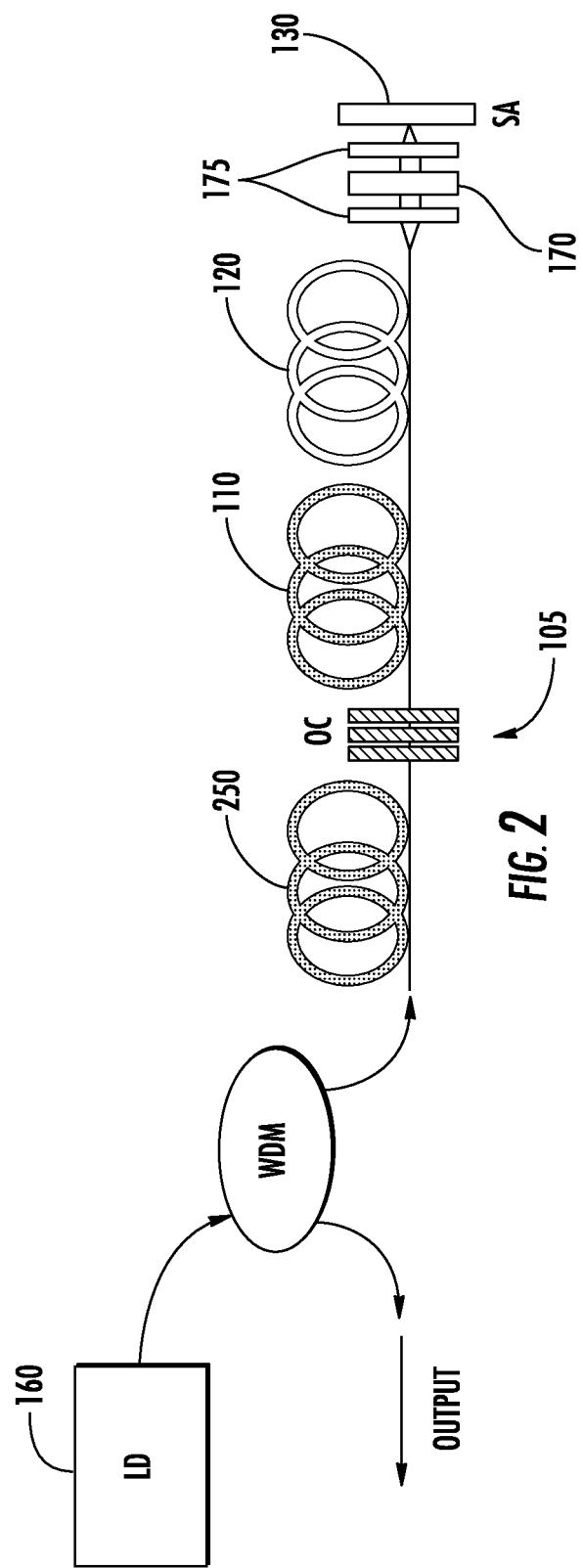
FIG. 2 schematically illustrates high energy ps fiber pulse oscillator according to FIG. 1 with an added amplification stage, providing a conventional MOPA configuration.

Regarding implementations for further amplification, most straight-forward are master-oscillator-power-amplifier (MOPA) configurations as shown in FIG. 2 and also discussed, for example, in U.S. Pat. No. 7,190,705 ('705). In an exemplary MOPA configuration in FIG. 2 of the present application a fiber amplifier 250, which corresponds to a power amplifier in the MOPA configuration, is disposed between the intra-cavity fiber grating 105 and the wavelength-division output coupler as also discussed in the '705 patent.

A limitation of MOPA designs is the relatively inefficient use of pump power, particularly when it is desired to reduce the repetition rate of the system via the implementation of a down counter to simplify the generation of high pulse energies. Repetition rate reduction or down counting is conveniently performed with the use of optical modulators as discussed in U.S. Pat. No. 8,072,678; optical down counters are well known in the state of the art and are not further discussed here. Optical down counters are generally implemented to reduce the pulse rate from a high repetition rate oscillator to facilitate the amplification of the oscillator pulses to high pulse energies.

Figure 3:
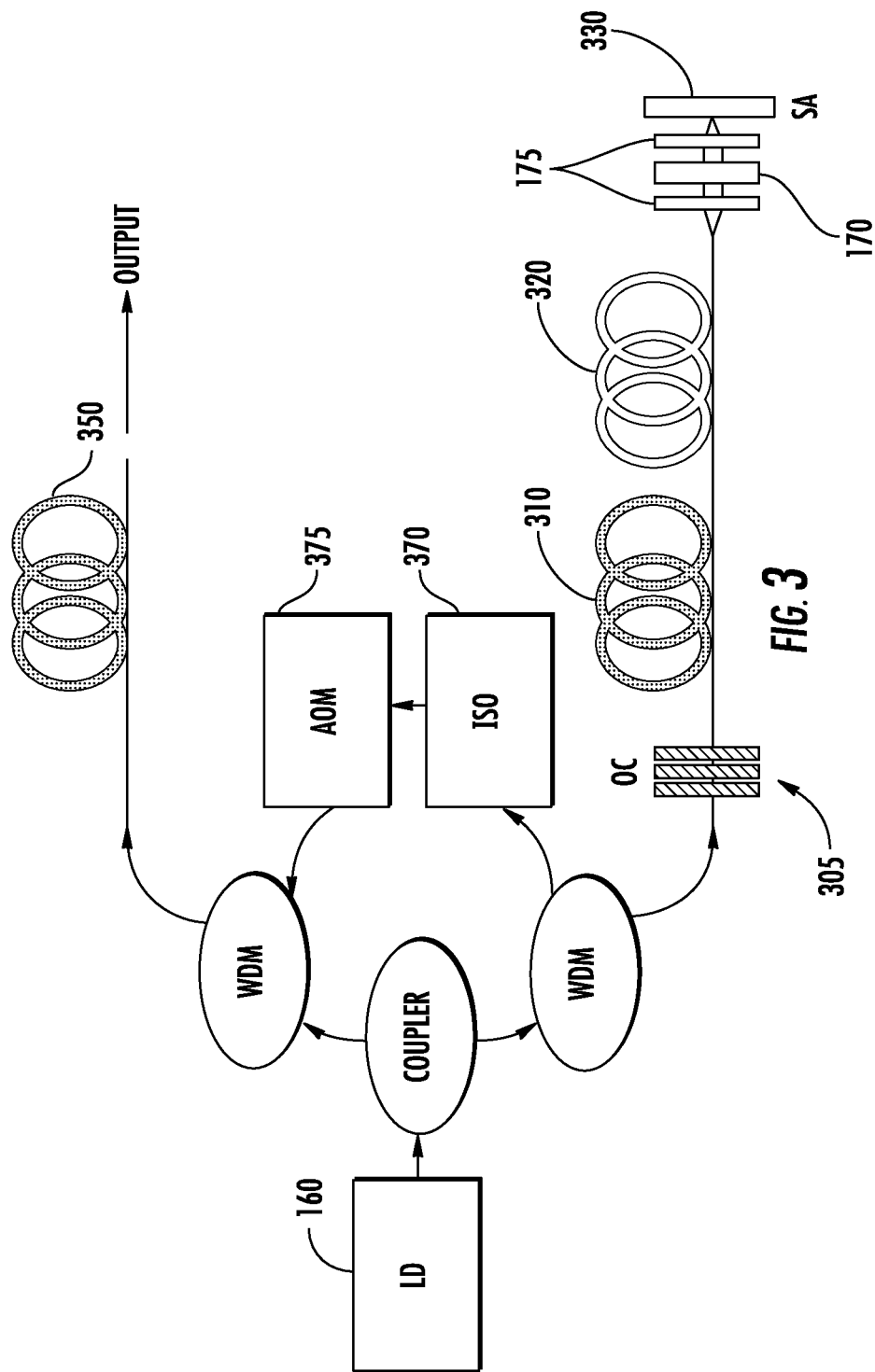
FIG. 3 schematically illustrates a high energy MOPA configuration in accordance with an embodiment of the present invention.

Improved MOPA configurations may be utilized in various embodiments of the present invention. A configuration providing highly-efficient use of pump power is shown in FIG. 3. In this example the pump from the laser diode (LD) 160 is split by a coupler into an oscillator arm (at the bottom) and an amplifier arm (top). The oscillator output is then directed through an optional isolator (ISO) 370 and an acousto-optic down-counter (AOM) 375 to an amplifier 350. The pump light is coupled to the oscillator via the grating coupler 305 and amplifier 350 respectively via the shown wavelength division-multiplexing couplers (WDM). All components were polarization maintaining and single-mode.

In a working example this split pumping scheme allowed the generation of more than 10 times higher pulse energies compared to a MOPA design. For example, an Yb oscillator that generated 50 ps pulses with a pulse energy of 4 nJ at 20 MHz, allowed for amplification up to a pulse energy of only 12 nJ in a MOPA configuration. In contrast, the split pumping scheme allowed for amplification up to pulse energy of 100 nJ with simultaneous down-counting to a pulse repetition rate of 1 MHz. The pump diode generated 600 mW at 980 nm in both cases. The split pumping scheme further enables down-counting to repetition rates as a low as 100 kHz with relatively small levels of amplified spontaneous emission in the amplifier.

Although the examples discussed above were based on standing wave cavities, fiber ring cavities can also be used in conjunction with fiber gratings, as already disclosed in U.S. Pat. No. 5,450,427. Also, twisted cavity designs can be implemented as for example disclosed in U.S. Patent Appl. Pub. No. 2011/0069723, entitled HIGHLY RARE-EARTH-DOPED OPTICAL FIBERS FOR FIBER LASERS AND AMPLIFIERS to Dong et al. The use of twisted cavities or ring lasers allows a further increase in oscillating pulse energies compared to standing wave cavities by a factor of 3-30, which is highly advantageous for amplification of the oscillator pulses to high pulse energies. Split pumping schemes can further be easily adapted to such cavities designs and are not separately explained here. Equally, instead of core pumped fiber oscillator and amplifiers as discussed here, cladding pumped oscillators and amplifiers can also be used. Cladding pumping is well known in the state of the art and not further explained here.

For the generation of high average powers, the seed systems discussed with respect to FIGS. 1-3 are further amplified in high power fiber or solid state amplifiers. In the case of fiber amplifiers, cladding pumping can be conveniently implemented and average powers in the range from 1 W to 1 kW can be readily obtained. The obtainable pulse energies and pulse peak powers are only limited by the self-focusing limit which can be >10 MW for example in Ho or Tm fiber amplifiers. Cladding pumped fiber amplifiers and solid-state amplifiers are well known in the state of the art and not further described here.

Particularly, when amplifying high energy pulses in positive dispersion amplifiers, self-phase modulation can lead to spectral broadening and therefore provides an opportunity for pulse compression after the amplification stage. Such schemes were for example discussed in U.S. Pat. Nos. 6,885,683 and 7,330,301 and also more recently in A. Steinmetz et al. However, as discussed by A. Steinmetz et al, nonlinear amplification of ps pulses with a width of around 100 ps typically produces relatively poor pulse quality after pulse compression.

Figure 4:
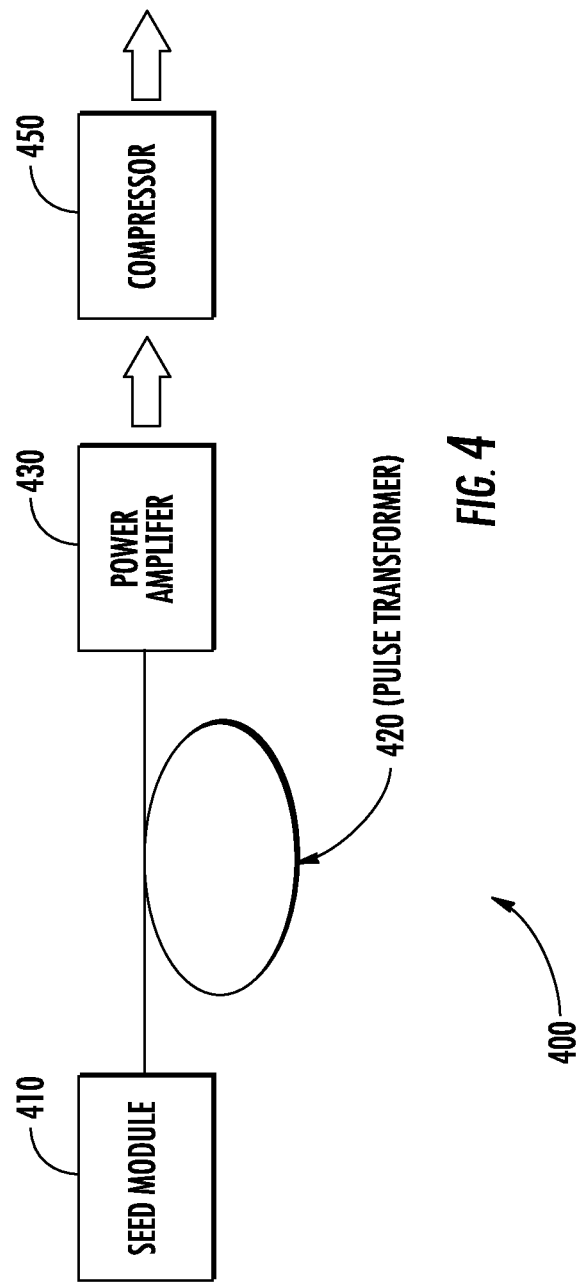
FIG. 4 schematically illustrates an example of an optical amplification system which includes a high energy ps fiber pulse oscillator, and a fiber-based pulse transformer which produces spectrally broadened pulses prior to power amplification and compression. The amplification system generates output pulse widths shorter than the oscillator pulse width.

A solution to this pulse quality problem is shown in FIG. 4. In accordance with an embodiment of the present invention FIG. 4 shows a high power fiber amplification system 400. The system comprises a seed module 410 as for example described with respect to FIGS. 1-3, delivering seed pulses. The seed module may be arranged in oscillator-only configuration as illustrated in FIG. 1, or include amplifier stage(s) as illustrated in FIGS. 2 and/or 3. In addition to fiber laser based seed sources, a seed source based on a solid-state laser, a micro-chip laser, a gain-switched, an externally modulated cw semiconductor laser or a mod-elocked semiconductor laser can also be implemented. For example the seed module can generate near bandwidth-limited or chirped 50 ps pulses with pulse energy of a few nJ.

In certain preferred embodiments the pulse transformer 420 comprises a relatively long length of amplifier fiber. Alternatively, a linear succession of short amplifier fiber sections with longer lengths of dispersive fibers located in-between the amplifier fiber sections may be utilized (not shown). Preferably the amplifier fiber sections are all spliced together to make a single integral pulse transformer unit. And also preferably, the fibers in the pulse transformer unit have overall positive dispersion. For example, such a pulse transformer unit can have an overall length of 30 m-3000 m.

The pulse transformer unit transforms a Gaussian-like pulse output from the seed module into a near parabolic, near linearly chirped pulse with a spectral bandwidth broader than that of the seed pulse. Generally, near parabolic pulses, which are produced by the pulse transformer unit, have lower pulse wings compared to Gaussian pulses. The near parabolic pulses are then injected into a fiber power amplifier 430, comprising large core fibers, such as fiber rods, leakage channel fibers, photonic crystal fiber or large pitch fibers.

At the output of the power amplifier a pulse compressor 450 temporally compresses the pulses to near the bandwidth limit. The pulse compressor can comprise a bulk grating arrangement, an optical arrangement using grisms, prisms, fiber Bragg gratings, bulk Bragg gratings, a length of photonic crystal fibers with a central air-hole or Kagome fibers. All these temporal pulse compressors are well known in the state of the art and not further explained here.

The addition of optimized pulse transformers enables a notable improvement in pulse quality obtainable after a final compressor stage. The improvement in pulse quality over the prior art here takes advantage of parabolic pulse forming processes in amplifier stages prior to final power amplification to improve pulse quality from nonlinear waveguide amplification systems that incorporate pulse compressors. At the same time the final power amplifier can be operated at high levels of self-phase modulation in order to maximize the obtainable pulse energy. Since power amplifiers are generally as short as possible to enable the amplification of the highest energy pulses, they are oftentimes too short to transform a ps pulse into a near parabolic pulse shape and hence it is desirable to inject a near parabolic pulse into a power amplifier in order to avoid the generation of non-compressible non-linear chirp during power amplification.

U.S. Pat. No. 6,885,683 is hereby incorporated by reference in its entirety. As expressly pointed out in '683, parabolic amplifiers obey simple scaling laws and allow for the generation of parabolic pulses. For example, a parabolic pulse with a spectral bandwidth of around 2 nm can be generated using a parabolic amplifier length of around 100 m. Specifically, ps-ns pulses can be transformed to near parabolic pulses by selecting appropriate fiber lengths, where the length of the pulse transformer needs to increase with an increase in pulse width. In other words, a much shorter pulse transformer can be used in conjunction with 10 and 20 ps seed pulses compared to 50 ps seed pulses. An exact pulse transformation is not required for improvement in compressed pulse quality; typically, an appropriate pulse transformer can be designed using nonlinear pulse propagation routines in a computer and can further be experimentally determined.

As an illustration of the dramatic improvement in pulse quality obtainable with an appropriately designed pulse transformer, numerical propagation routines were applied to a specific example. In the specific example a pulse transformer length of 440 m was assumed for 40 ps pulse(s) amplified in a large core fiber to a pulse energy of >10 µJ, allowing for pulse compression to a pulse width of less than 1 ps in a grating compressor. The pulse transformer length and the input pulse energy of 500 pJ to the pulse transformer were further designed to stay just below the onset of stimulated Raman scattering, i.e. any increase in input pulse energy compared to the presently used value, would result in the onset of stimulated Raman scattering, which is typically undesirable. The output energy of the pulse transformer was further designed to be 10 nJ to provide enough seed pulse energy to seed a power amplifier allowing for the amplification of the pulses to pulse energies >10 µJ, without the onset of stimulated Raman scattering in the power amplifier. Here most of the amplification in the pulse transformer was confined to the end of the pulse transformer to prevent the onset of stimulated Raman scattering in the pulse transformer.

Figure 4A:
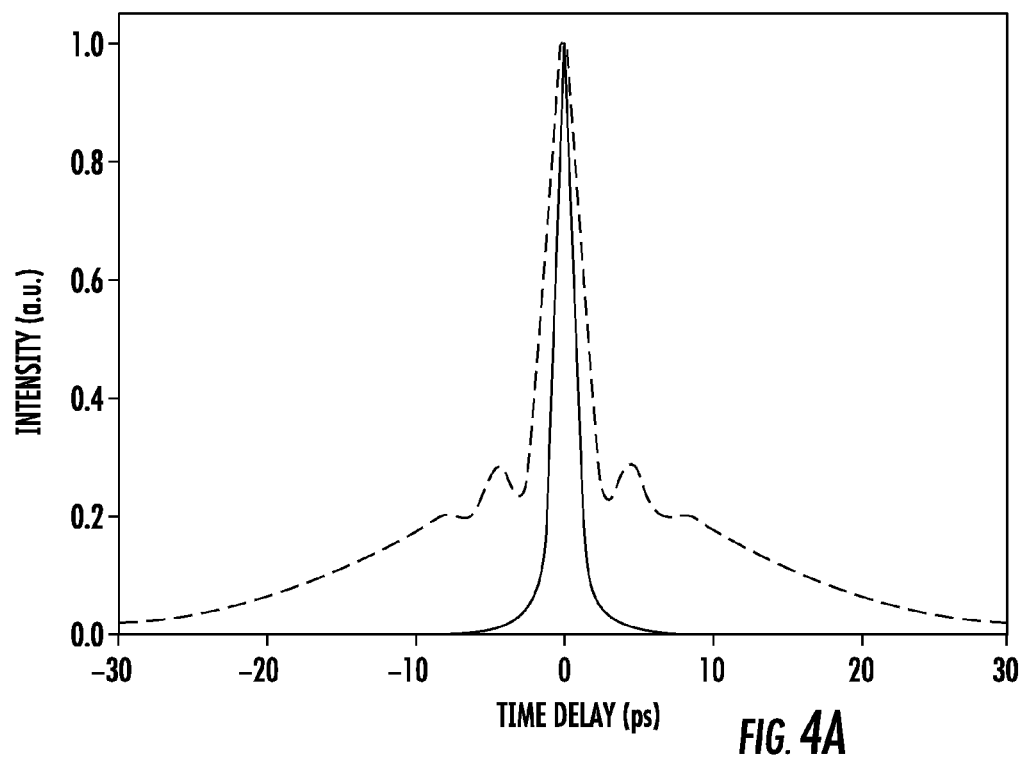
FIGS. 4a and 4b are plots of simulation results that show the improvement in pulse quality obtainable with an appropriately designed pulse transformer.
Figure 4B:
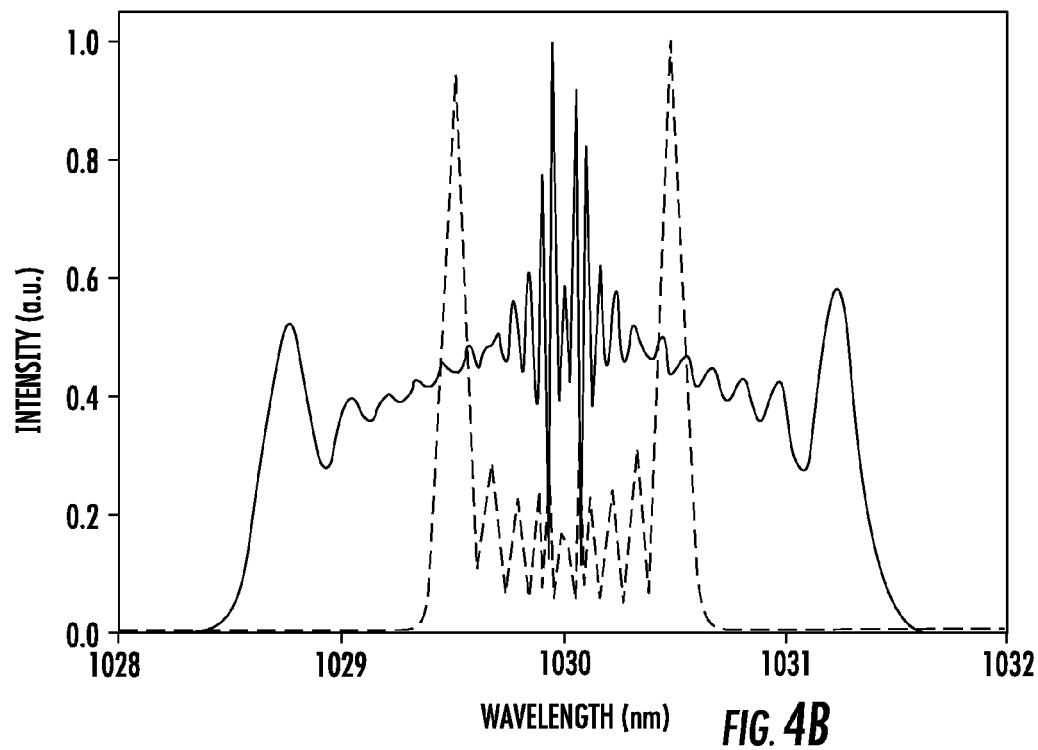

The resulting approximations are shown in FIGS. 4a and 4b). Here FIG. 4a) illustrates the obtainable autocorrelation traces of compressed 1 ps pulses obtained with (solid line) and without the pulse transformer (dashed line). FIG. 4b) illustrates the corresponding optical spectra at the output of the power amplifier. Here the data without the pulse transformer were generated by assuming a short 3 m length pre-amplifier, instead of the pulse transformer. The great improvement in achievable pulse quality with the pulse transformer is evident from FIG. 4a. Although FIGS. 4a) and 4b) show an ideal case, it is to be understood that a substantial improvement in pulse quality can also be obtained by using shorter pulse transformer lengths of the order of 30-200 m.

Here the achievable pulse energy and pulse peak power depends on the doping level and core diameter of the implemented large core fiber. The ultimate peak power limit of fiber amplifiers is the self-focusing limit of around 5 MW at a wavelength near 1000 nm and around 10 MW near 2000 nm. Hence, in the 1000 nm wavelength region, 50 ps pulses can in principle be amplified to pulse energies up to 250 µJ. For some applications, pulse energies <10 µJ may also be of interest, even for these smaller pulse energies the implementation of pulse transformers as discussed with respect to FIG. 4 are highly beneficial.

It is instructive to distinguish the present nonlinear amplification technique from conventional chirped pulse amplification systems. In chirped pulse amplification, a short pulse (sub ps to a few ps) from an oscillator is temporally stretched in a pulse stretcher, amplified and subsequently compressed in a pulse compressor, where the pulse stretching and amplification stages are preferably only slightly nonlinear. The small nonlinearity manifests itself in limited spectral broadening in either the stretcher or amplifier stages, i.e. the amplifier output typically has a bandwidth which is smaller than the oscillator bandwidth. Alternatively, the amplifier output typically has a bandwidth which is smaller than the input to the amplifier. Typically, the pulse stretcher stretches the pulses by more than a factor of ten.

In the present nonlinear amplification system, a long, >5 ps pulse, and up to about 1 ns, is generated by a seed system, subsequently this ps-ns pulse is transformed in a pulse transformer 420 into a near parabolic pulse, linearly or non-linearly amplified in a power amplifier 430 and finally compressed in a pulse compressor 450. Here the pulse transformer provides only a small amount of pulse stretching, for example the pulses are preferably stretched by less than a factor of ten in the pulse transformer. In the calculation example described with respect to FIGS. 4a and 4b, the pulse stretching factor was around 1.75. The high level of nonlinearity in the pulse transformer or power amplifier generally manifests itself in a pulse transformer output spectral bandwidth which is significantly larger than the input bandwidth to the pulse transformer, say by a factor of 1.5. In the calculation example described with respect to FIGS. 4a and 4b, the spectral broadening factor was in the range from 10-40. Alternatively, the high level nonlinearity in the amplifier manifests itself in an amplifier output bandwidth that can be larger than the amplifier input bandwidth. Such highly nonlinear power amplifiers are further susceptible to multi-pass interference from fiber or optical components up-stream of the power amplifier. Fortunately, multi-pass interference from optical components upstream of the pulse transformer have only a very limited effect on compressible pulse quality, since the pulses inserted into the pulse transformer are typically only slightly chirped. Most detrimental is any multi-pass interference arising from optical components that are traversed when the pulses are significantly spectrally broadened or chirped. For example detrimental multi-pass interference can arise from birefringent optical components located between the output of the pulse transformer and the input to the power amplifier. One viable option for minimization of such multi-pass interference at this stage is to couple the output of the pulse transformer directly into the power amplifier without any intervening additional birefringent fibers. The use of non-birefringent or polarizing power amplifiers as well known in the state of the art can also help to suppress multi-pass interference.

In other nonlinear amplification schemes the need for pulse transformation to a near parabolic near linearly chirped waveform has not been realized. Moreover, the use of modelocked fiber oscillators generating pulses >5 ps as input to such systems has not been suggested.

A useful way of characterizing the action of a pulse transformer is the obtained reduction in pulse pedestal after the final compression stage 450 by the insertion of undoped fiber into the pulse transformer. For example, if the pulse transformer 450 is configured as pre-amplifier containing lengths of undoped and doped fibers, the elimination of most of the undoped fiber in the pulse transformer would decrease the obtainable pulse quality after the final compression stage, as evident from FIG. 4b.

Pulse transformers that do not provide any gain can also improve the pulse quality at the output of the pulse compressor; preferably, the pulse transformer imparts non-negligible nonlinear self-phase modulation onto the injected pulse, for example a level of self-phase modulation $>\pi$, and up to about $100\pi$, limited by the onset of stimulated Raman scattering in the pulse transformer. Pulse transformers can also be designed using sections of fibers with decreasing mode size so as to increase self-phase modulation in order to improve pulse quality.

Compared to prior art chirped pulse amplification systems, the final power amplifiers can be operated at larger levels of self-phase modulation, allowing for the extraction of increased pulse energy from short pulse fiber systems.

In addition to only one power amplifier, more than one power amplifier, for example a fiber power amplifier and a fiber rod amplifier can be implemented.

From the known power limitations of fiber amplifiers, the achievable pulse energies from such systems scale approximately linearly with the implemented seed pulse width. Therefore, the nonlinear amplification system described is preferably implemented using pulses with a width >5 ps and more preferably with pulses with a width >10 ps, and up to about 1000 ps, whereas for chirped pulse amplification systems, seed pulses with a width <5 ps are preferred. The use of chirped pulses in the pulse transformer is further advantageous, as it allows a reduction in required pulse transformer length. Particularly for pulses >100 ps, the onset of stimulated Raman scattering limits the amount of spectral broadening one can obtain in a pulse transformer.

In contrast to chirped pulse amplification, nonlinear amplification systems further allow the use of partially coherent or incoherent seed sources. A long pulse transformer length can also transform such pulses into near parabolic pulses, allowing for some degree of pulse compression in the pulse compressor. The basic configuration of such a system is similar to the one shown in FIG. 4 and is not further described here.

In various embodiments solid-state amplifiers can further be incorporated after the fiber power amplifier in FIG. 4 to enable the generation of higher pulse energies.

The nonlinear amplification scheme here is applicable to any type of fiber amplifier; for example high power Er amplifiers can also be constructed as shown in FIG. 4. In this case Er fiber amplifiers with positive dispersion can be implemented. Due to the bandwidth-limitation of Er amplifiers, undoped positive or negative dispersion fibers can be spliced onto the end of the Er power amplifier to further increase the bandwidth of the amplified pulses. This is not separately shown. For final pulse compression, a separate pulse compression element 450 is still required. When using undoped negative dispersion fiber, spectral broadening can be combined with pulse compression. Element 450 can combine spectral broadening and pulse compression. The insertion of an undoped fiber section after a power amplifier for pulse broadening is indeed useful for any rare-earth amplifier and not separately discussed here. High energy pulses with pulse widths <200 fs can thus be generated with such nonlinear amplification schemes using ps Er amplifiers in the seed module. To achieve the shortest possible pulses from such amplifiers, the control of $3^{rd}$ and $4^{th}$ order dispersion also become significant, i.e. the third order dispersion of the overall system needs to be adjusted to enable optimum pulse quality at the final output of the system. For example, third and fourth order dispersion can be manipulated by using pulse transformer fibers with appropriate values of third order dispersion. Such fibers are well known in the state of the art and not further described here.

When using Tm amplifiers or large core Er amplifiers, the scheme as shown in FIG. 4 can also be implemented. In this case, the pulse transformer preferably comprises long lengths of positive dispersion fiber and short lengths of Tm or Er fiber, selected in such a way that the amount of self-phase modulation dominates in the lengths of positive dispersion fiber. Because large core Tm or Er power amplifiers generally have large values of negative dispersion, the Tm or Er amplifier will produce pulse compression, however, the presence of a near parabolic seed pulse minimizes pulse distortions during pulse compression. More generally, with a near parabolic seed pulse, in the presence of an undoped negative dispersion fiber, or fiber amplifier, and self-phase modulation, the pulse spectral bandwidth increases and the pulse width decreases, while the parabolic pulse shape is also preserved. Numerical simulations verified that inverted parabolic pulse amplifiers can sustain self-phase modulation values of several $\pi$ without detrimental pulse distortions. Since spectral broadening in inverted parabolic amplifiers increases with a reduction in pulse width, the parabolic pulses are preferably coupled out of the inverted parabolic amplifier while still being positively chirped. A subsequent conventional pulse compressor can then be used to compress the pulses close to the bandwidth limit.

Figure 5:
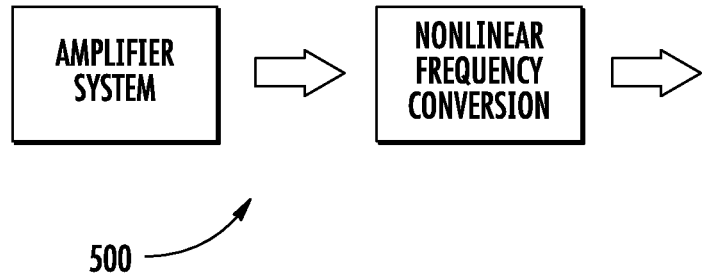
FIG. 5 schematically illustrates a fiber ps pulse amplification system with frequency conversion of the amplification system output.

In various embodiments the laser systems shown in FIGS. 1-3 can be configured for further amplification. Amplification systems as shown in FIG. 4 can also be implemented and further combined with nonlinear frequency conversion techniques, such as frequency doubling, tripling, quadrupling or even quintupling. Optical parametric generation or amplification can be used for frequency down conversion of the amplifier output. Optical schemes for frequency conversion are well known in the state of the art and not further described here. A generic scheme for frequency conversion 500 is shown in FIG. 5. When implementing nonlinear frequency down-conversion, optical parametric amplification can also be implemented; such schemes were discussed for example in U.S. Pat. No. 8,040,929 and are not further described here.

Figure 6A:
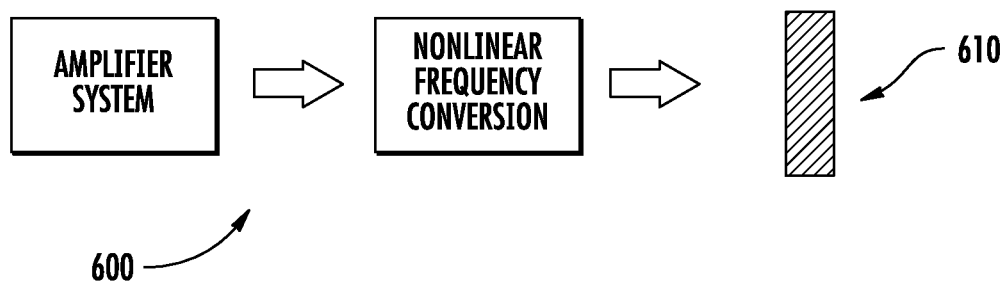
FIG. 6a schematically illustrates an amplification system and frequency conversion arrangement of FIG. 5 configured for ionization of a material.

The laser systems as described here are suitable for micro-machining applications or for the ionization of solid, liquids or gases as well as desorption of molecules from target materials. A generic system implementation 600 is shown in FIG. 6a. Typically an optical focusing arrangement (not shown) is further included to attain a desired beam size on the target 610. For specific applications, an x-y scanner can be inserted upstream of the target material to move the laser beam to the desired target site. Alternatively, the target 610 can be manipulated in three dimensions using appropriate opto-mechanical stages, as well known in the state of the art. A scanning stage is not separately shown here.

Specifically, the laser systems as described here are suitable for mass spectroscopy applications as a means of desorbing molecules. Target molecules in a condensed phase must be desorbed from the surface and ionized in order to be carried by the spectrometer electric field. In the typical method of matrix-assisted laser desorption/ionization (MALDI), strong absorption of ultraviolet laser light by a matrix is used to desorb and ionize embedded target molecules. The ultraviolet light can be replaced with infrared light from laser systems as described here. The new wavelength can be chosen to be resonant with a more desirable matrix, while reducing direct interaction with the target. Alternatively, off-resonant infrared light is advantageous due to the greater penetration depth, accessing material further down in the matrix, as in Rezenom et al. in 'Infrared laser-assisted desorption electrospray ionization mass spectrometry' published on Nov. 29, 2007, in Volume 133 of Analyst, pp. 226-232 (2008). The non-resonant interaction is also nonlinear, which is advantageous for the greater control over interaction volume size by controlling the focal volume.

Moreover, the short and intense infrared pulses from laser systems as described can further be used as a means of ionizing target molecules either during desorption from the condensed phase, or directly from the gas phase. This type of ionization is a softer ionization source that can cause less undesired fragmentation than electrospray, the typical ionization method in the gas phase. For such applications, infrared wavelengths are desirable for their non-resonant tunnel ionization that works for all types of molecules without relying on a particular resonance. The high repetition rates of fiber lasers are desirable for increasing detection efficiency. The benefits of tunnel ionization by infrared laser pulses for mass spectroscopy are described in Peng et al., High-Pressure Gas Phase Femtosecond Laser Ionization Mass Spectrometry in the Jul. 3, 2012, Volume 84 issue of Analytical Chemistry. Pulse widths from 100 fs-10 ns can be readily implemented for desorption or ionization applications and wavelengths can be readily selected from the 1 μm to 8 μm range.

Figure 6B:
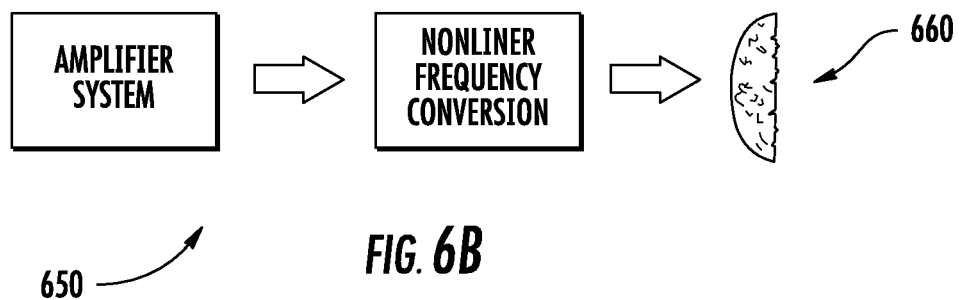
FIG. 6b schematically illustrates an amplification system and frequency conversion arrangement of FIG. 5 configured for tissue cutting.

Finally, the laser systems as described here are also suitable for medical processing applications, such as surgery or tissue cutting. The benefits of ps lasers for applications in surgery were for example described in Saeid Amini-Nik, Ultrafast Mid-IR Laser Scalpel: Protein Signals of the Fundamental Limits to Minimally Invasive Surgery in the September 2010, Volume 5 issue of PLoS ONE. For such applications frequency down-converted fiber lasers are desirable, where the frequency is down-converted to the 2.6-6 μm wavelength range depending on the target medical material. A generic system implementation 650 is shown in FIG. 6b in which biological material 660 is to be heated, cut, ablated or otherwise modified. Optical focusing arrangements and opto-mechanical arrangements for two or three dimensional scanning as discussed with respect to FIG. 6 are not separately shown here.

The above description of the preferred embodiments has been given by way of example. From the disclosure given, those skilled in the art will not only understand the present invention and its attendant advantages, but will also find apparent various changes and modifications to the structures and methods disclosed. It is sought, therefore, to cover all such changes and modifications as fall within the spirit and scope of the invention, as defined by the appended claims, and equivalents thereof.

As used herein, the term "or" is intended to mean an inclusive "or" rather than an exclusive "or", unless specified. In addition, the articles "a" and "an" as used in this application and the appended claims are to be construed to mean "one or more" or "at least one" unless specified otherwise.

For purposes of summarizing the present invention, certain aspects, advantages and novel features of the present invention are described herein. It is to be understood, however, that not necessarily all such advantages may be achieved in accordance with any particular embodiment Thus, the present invention may be embodied or carried out in a manner that achieves one or more advantages without necessarily achieving other advantages as may be taught or suggested herein.

Thus, while only certain embodiments have been specifically described herein, it will be apparent that numerous modifications may be made thereto without departing from the spirit and scope of the invention. Further, acronyms are used merely to enhance the readability of the specification and claims. It should be noted that these acronyms are not intended to lessen the generality of the terms used and they should not be construed to restrict the scope of the claims to the embodiments described therein.

What is claimed is:

1. An optical amplification system, comprising:
a fiber laser seed source producing seed pulses at a repetition rate corresponding to the fiber laser cavity round trip time, said seed source producing seed pulses having a pulse width greater than about 5 picoseconds (ps);
a nonlinear pulse transformer comprising a fiber having a length greater than about 10 m, said pulse transformer receiving a ps seed pulse at its input and producing a spectrally broadened ps output pulse at its output, said ps output pulse having a spectral bandwidth which is more than 1.5 times a spectral bandwidth of a ps seed pulse, wherein a pulse input to said nonlinear pulse transformer is stretched by less than a factor of ten in said pulse transformer;
a Yb: fiber power amplifier receiving and amplifying said spectrally broadened ps output pulse said power amplifier producing amplification near 1000 nm and arranged with a pump source for one or both of cladding pumping or core pumping at a pump wavelength of about 980 nm; and
a pulse compressor configured to temporally compress spectrally broadened pulses amplified by said power amplifier.

2. An optical amplification system according to claim 1, wherein said nonlinear pulse transformer comprises a fiber having length greater than about 20 m and less than 3000 m.

3. An optical amplification system according to claim 1, wherein said seed source generates a pulse width greater than 10 ps.

4. An optical amplification system according to claim 1, wherein a pulse width generated with said ps seed source is compressible to a pulse width less than 5 ps.

5. An optical amplification system according to claim 1, wherein said nonlinear pulse transformer spectrally broadens a pulse injected to its input by a factor >2.

6. An optical amplification system according to claim 1, wherein said nonlinear pulse transformer spectrally broadens a pulse injected to its input by a factor >4.

7. An optical amplification system according to claim 1, said amplification system further comprising a down counter.

8. An optical amplification system according to claim 1, wherein said nonlinear pulse transformer comprises lengths of amplifier fiber and passive undoped fiber.

9. An optical amplification system according to claim 1, wherein said fiber seed source comprises a modelocked fiber laser.

10. An optical amplification system according to claim 1, wherein said pulse compressor comprises at least one of a fiber Bragg grating, a bulk grating, prism, grism, a section of bulk material, a photonic crystal fiber or a Kagome fiber.

11. An optical amplification system according to claim 1, said amplification system further comprising an undoped fiber inserted after the power amplifier configured to spectrally broaden the pulses coupled out of the power amplifier.

12. An optical amplification system according to claim 1, wherein said amplification system is further configured to substantially optimize the pulse quality of the pulses coupled out of the pulse compressor by insertion of elements with optimized values of $3^{rd}$ and $4^{th}$ order dispersion.

13. An optical amplification system, comprising:
a fiber laser seed source producing seed pulses at a repetition rate corresponding to the fiber laser cavity round trip time;
a nonlinear pulse transformer, said pulse transformer receiving picosecond (ps) pulses at its input and producing a spectrally broadened ps output pulse at its output, said ps output pulse having a spectral bandwidth which is more than 1.5 times a spectral bandwidth of a ps seed pulse, wherein a pulse input to said nonlinear pulse transformer is stretched by less than a factor of ten in said pulse transformer;
a Yb: fiber power amplifier which receives and amplifies said spectrally broadened pulse to produce a pulse energy greater than about 5 µJ, said power amplifier producing amplification near 1000 nm and arranged with a pump source for one or both of cladding pumping or core pumping at a pump wavelength of about 980 nm; and
a pulse compressor configured to temporally compress spectrally broadened pulses amplified by said power amplifier.

14. An optical amplification system according to claim 13, wherein said nonlinear pulse transformer comprises a fiber having a length greater than about 20 m and less than 3000 m.

15. An optical amplification system according to claim 13, wherein said seed source generates a pulse width >10 ps.

16. An optical amplification system according to claim 13, wherein a pulse width generated with said ps seed source is compressible to a pulse width less than 5 ps.

17. An optical amplification system according to claim 13, said amplification system further comprising a down counter.

18. An optical amplification system according to claim 13, wherein said nonlinear pulse transformer comprises lengths of amplifier fiber and passive undoped fiber.

19. An optical amplification system according to claim 13, wherein said fiber seed source comprises a modelocked fiber laser.

20. An optical amplification system according to claim 13, wherein said pulse compressor comprises at least one of a fiber Bragg grating, a bulk grating, prism, grism, a section of bulk material, a photonic crystal fiber or a Kagome fiber.

21. An optical amplification system according to claim 13, said amplification system further comprising an undoped fiber inserted after the power amplifier configured to spectrally broaden the pulses coupled out of the power amplifier.

22. An optical amplification system according to claim 1, wherein said amplification system is configured as an element of a system for laser-based, biological tissue processing.

23. An optical amplification system, comprising:
a ps noise seed source, said noise seed source producing incoherent or partially coherent pulses with a pulse width greater than about 10 ps;
a nonlinear pulse transformer, said pulse transformer receiving a ps pulse at its input and producing a spectrally broadened ps pulse at its output, wherein a pulse input to said nonlinear pulse transformer is stretched by less than a factor of ten in said pulse transformer;

a nonlinear Yb: fiber power amplifier, said nonlinear power amplifier producing amplification near 1000 nm and arranged with a pump source for one or both of cladding pumping or core pumping at a pump wavelength of about 980 nm; and a compressor configured to temporally compress spectrally broadened pulses amplified by said nonlinear power amplifier.

24. The amplification system of claim 23, wherein said incoherent or partially coherent pulses are generated by a fiber-based modelocked laser, a semiconductor mode locked laser, a Fourier domain mode locked laser, or a gain-switched laser diode.

25. The optical amplification system of claim 1, wherein said pulse transformer comprises a length of Yb: amplifier fiber, and said pump source is configured to pump said length of Yb: amplifier fiber.

26. The optical amplification system of claim 25, wherein said pulse transformer is arranged with a succession of relatively short amplifier fiber sections with longer lengths of dispersive fibers located between the amplifier fiber sections.

27. The optical amplification system of claim 26, wherein the sections are interconnected via fiber splices to form a substantially integral pulse transformer.

28. The optical amplification system of claim 26, wherein the fibers of said pulse transformer each have overall positive dispersion.

29. The optical amplification system of claim 13, wherein said pulse transformer comprises a length of Yb: amplifier fiber, and said pump source is configured to pump said length of Yb: amplifier fiber.

30. The optical amplification system of claim 29, wherein said pulse transformer is arranged with a succession of relatively short amplifier fiber sections with longer lengths of dispersive fibers located between the amplifier fiber sections.

31. The optical amplification system of claim 30, wherein the sections are interconnected via fiber splices to form a substantially integral pulse transformer.

32. The optical amplification system of claim 30, wherein the fibers of said pulse transformer each have overall positive dispersion.

33. The optical amplification system of claim 23, wherein said pulse transformer comprises a length of Yb: amplifier fiber, and said pump source is configured to pump said length of Yb: amplifier fiber.

34. The optical amplification system of claim 33, wherein said pulse transformer is arranged with a succession of relatively short amplifier fiber sections with longer lengths of dispersive fibers located between the amplifier fiber sections.

35. The optical amplification system of claim 34, wherein the sections are interconnected via fiber splices to form a substantially integral pulse transformer.

36. The optical amplification system of claim 34, wherein the fibers of said pulse transformer each have overall positive dispersion.

* * * * *